(12) United States Patent
Tien

(10) Patent No.: US 6,802,432 B1
(45) Date of Patent: Oct. 12, 2004

(54) ENAMEL COOKING WARE

(75) Inventor: Liu Shu Tien, Taipei (TW)

(73) Assignee: First Enamel Industrial Corp., Taipei (TW)

( * ) Notice: Subject to any disclaimer, the term of this patent is extended or adjusted under 35 U.S.C. 154(b) by 0 days.

(21) Appl. No.: 10/462,622

(22) Filed: Jun. 17, 2003

(51) Int. Cl.[7] ............................................. H05B 1/02
(52) U.S. Cl. ............................. 220/573.2; 220/573.1; 428/683
(58) Field of Search ............................ 220/455, 573.1, 220/573.2, 573.3; 428/683

(56) References Cited

U.S. PATENT DOCUMENTS

| | | | | |
|---|---|---|---|---|
| 3,788,513 A | * | 1/1974 | Racz | 428/622 |
| 4,646,935 A | * | 3/1987 | Ulam | 220/573.1 |
| 5,102,573 A | * | 4/1992 | Han et al. | 134/19 |
| 5,478,651 A | * | 12/1995 | Tannenbaum | 428/422 |
| 5,510,052 A | * | 4/1996 | McCandlish | 510/218 |
| 5,565,419 A | * | 10/1996 | Thomas et al. | 510/197 |
| 5,662,026 A | * | 9/1997 | Prakasa | 99/413 |
| 5,728,608 A | * | 3/1998 | Su et al. | 438/149 |
| 6,228,832 B1 | * | 5/2001 | Kinscherf et al. | 510/417 |
| 6,362,155 B1 | * | 3/2002 | Kinscherf | 510/417 |
| 6,596,380 B1 | * | 7/2003 | Buffard et al. | 428/201 |

* cited by examiner

Primary Examiner—Joseph Man-Fu Moy
(74) Attorney, Agent, or Firm—Troxell Law Office PLLC

(57) ABSTRACT

An enamel cooking ware, of which the cooking ware's body consists of an inner coating layer, an outer coating layer, and the cooking ware's body; wherein, the cooking ware body is made of stainless steel, and a dense mass of small concaves with small sizes is formed on its surface. Both of the inner and outer coating layers are enamel layers; such enamel cooking ware, of which the thickness of cooking ware's body can be greatly reduced, the covering capability of the enamel-surface layer also can be enhanced greatly, and the weight can be lowered substantially.

4 Claims, 1 Drawing Sheet

ENAMEL COOKING WARE

BACKGROUND OF THE INVENTION

1. Field of the Invention

The present invention relates to an enamel cooking ware, especially to an enamel cooking ware having better heat-conductivity rusty and a better adhesive force of the enamel surface.

2. Description of the Prior Art

The present invention relates to an enamel cooking ware having better heat-conductivity and better coating capability of the surface enamel.

As a well-known knowledge, the enamel cooking ware is used generally for many years. An initial enamel cooking ware is shown in FIG. 1A. Wherein, the cooking ware's body 100 is a single-layer formation, which is made of carbon steel by die-casting, and then a layer of enamel 200 is coated thereon. However, the cast iron can be oxidized easily, and it gets rusty quickly. Furthermore, after it gets rusty, it then becomes not clean and not easy to wash. Such that bacteria attach to it and grow therewith. It then causes the problems of health to the people. An improvement is then generated as shown in FIG. 1B, wherein the inner and outer surfaces of the single-layer cooking ware's body are both coated with enamel layers 200A and 200B, respectively. Nevertheless, since the enamel is a chemical composition, which would cause peoples to doubt about that the toxic chemical ingredients may be liberated from the enamel pot.

In accordance with the above disadvantages of the conventional enamel pot, the inventor of the present invention is devoted to the improvement and the experiment, and the enamel cooking ware of the present invention is generated finally.

SUMMARY OF THE INVENTION

Accordingly, it is an object of the present invention to provide an enamel cooking ware, wherein the material quantity is thinner and reduced, so that the weight of the enamel cooking ware can be lowered substantially.

The enamel cooking ware according to the present invention, wherein the cooking ware's body is made of stainless steel which cannot be oxidized. Therefore, by using such enamel cooking ware, the effect of cooking is enhanced conspicuously. This is another object of the present invention.

The enamel cooking ware according to the present invention, wherein the cooking ware's body made of stainless steel is firstly treated and which has better combinative capability with the enamel in comparison with the conventional one. Therefore, the enamel surface of the cooking ware would not peel off, and a beautiful appearance can be maintained. This is a further object of the present invention.

The enamel cooking ware according to the present invention, of which the cooking ware's body is made of stainless steel, thus it is relatively cleaner than a conventional enamel cooking ware. It is also easy to be washed clean, so as to get rid of the attachment of bacteria. It then does not have the problems to people's health. This is again a further object of the present invention.

The present invention will be better understood and its numerous objects and advantages will become apparent to those skilled in the art by referencing to the following drawings as follows.

DETAILED DESCRIPTION OF THE PREFERRED EMBODIMENTS

Figure 1A:
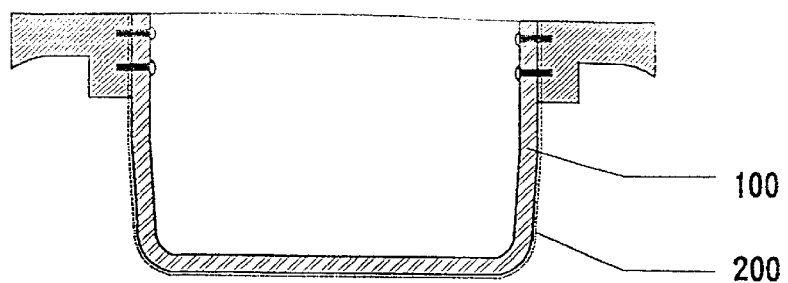
FIGS. 1A through 1B are perspective views showing a conventional enamel cooking ware.
Figure 1B:
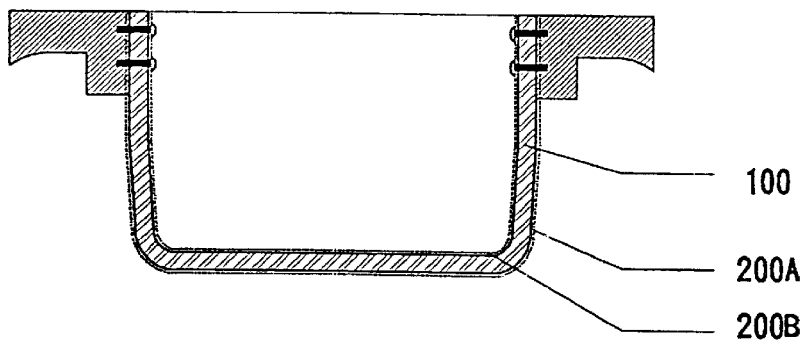

FIGS. 1A through 1B are cross-sectional views showing the conventional enamel cooking wares. The constitution and the disadvantages thereof are already described above, so that no redundant descriptions here.

Figure 2:
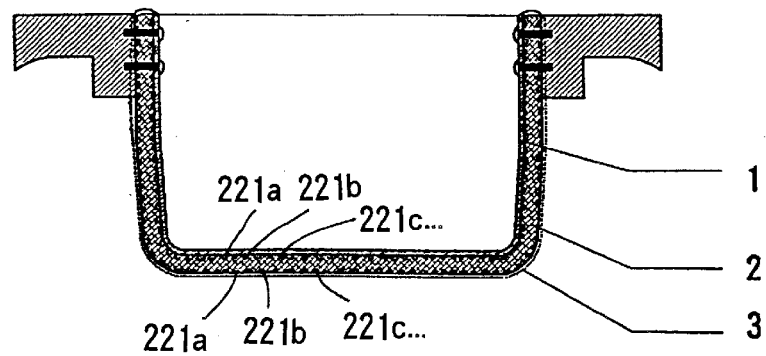
FIG. 2 is a perspective view showing the constitution of an enamel cooking ware according to the present invention.

FIG. 2 is a cross-sectional view showing the constitution of the enamel cooking ware according to the present invention. It can be seen apparently in the figure that the body of the enamel cooking ware according to the present invention consists of an inner coating layer 1, covering the inner surface of the cooking ware's body, a cooking ware's body 2, and an outer coating layer 3 covered onto the outer surface of the cooking ware's body. Wherein, the inner coating layer 1 of the cooking ware's body is an enamel layer, the cooking ware's body 2 is made of stainless steel, and the outer coating layer 3 coated onto the outer surface of the cooking ware's body 2 is also an enamel layer.

In order to increase the adhesion force of enamel surface onto the cooking ware's body 2, after the cooking ware's body 2 is formed, the cooking ware's body 2 is put into an injection stream of sand, then a dense mass of small concaves 211a, 211b, 211c. . . , 221a, 221b, 221c. . . with small sizes is formed on the surface of the cooking ware's body 2. When the coating of inner coating layer 1 and outer coating layer 3 is performed, the enamel then would flow into all the said concaves 211a, 21b, 211c. . . , 221a, 221b, 221c. . . And then, the enamel inner coating layer 1 and the outer coating layer 3 would strongly adhere onto the surface of the cooking ware's body 2.

Since the cooking ware's body of the present invention is made of stainless steel, the thickness of the cooking ware's body can be reduced greatly, thus the weight of the enamel cooking ware according to the present invention is lowered substantially. Moreover, in the enamel cooking ware according to the present invention, since the cooking ware's body 2 is made of stainless steel and which cannot be oxidized, thus the enamel layer 1, 3 with better coating force on the surface of the cooking ware's body can be accomplished. And, even the enamel layers 1, 3 are cracked, the cooking ware still can be used by people. It is a cooking ware with much more safety than the conventional one.

It is known from the above descriptions that the conventional enamel cooking ware with the disadvantages of heaviness, bad heat-conductivity and bad coating capability of the surface enamel layer can be improved. The enamel cooking ware according to the present invention, of which thickness of cooking ware body is reduced, then the cost is lowered, the heat-conductivity thereof is raised, and the coating capability of the surface enamel layer thereon is enhanced.

Although the present invention has been described using specified embodiment, the examples are meant to be illustrative and not restrictive. It is clear that many other variations would be possible without departing from the basic approach, demonstrated in the present invention.

What is claimed is:

1. An enamel cooking ware, of which the cooking ware's body consists of an inner coating layer, an outer coating layer, and the stainless cooking ware's body; wherein, both of the inner coating layer and the outer coating layer of the cooking ware's body are the enamel layers; such enamel cooking ware, of which the thickness of cooking ware's body can be reduced and then the heat-conductivity can be raised greatly, also the coating capability of the enamel-surface layer can be enhanced greatly.

2. The enamel cooking ware as claimed in claim 1, wherein only the outer surface of the cooking ware's body is coated by enamel.

3. The enamel cooking ware as claimed in claim 1, wherein a dense mass of small concaves with small sizes is formed on the surfaces of the cooking ware's body.

4. The enamel cooking ware as claimed in claim 2, wherein a dense mass of small concaves with small sizes is formed on the surface of the cooking ware's body.

* * * * *